United States Patent [19]
Meyer et al.

[11] Patent Number: 6,008,274
[45] Date of Patent: Dec. 28, 1999

[54] STABILIZATION OF COPOLYMERS OF MALEIC ACID OR MALEIC ANHYDRIDE AND VINYL ALKYL ETHERS

[75] Inventors: Harald Meyer, Deidesheim; Axel Sanner, Frankenthal; Franz Frosch, Bad Duerkheim; Hans Richter, Ludwigshafen, all of Germany

[73] Assignee: BASF Aktiengesellschaft, Ludwigshafen, Germany

[21] Appl. No.: 08/307,786

[22] PCT Filed: Apr. 20, 1993

[86] PCT No.: PCT/EP93/00954

§ 371 Date: Sep. 30, 1994

§ 102(e) Date: Sep. 30, 1994

[87] PCT Pub. No.: WO93/22374

PCT Pub. Date: Nov. 11, 1993

[30] Foreign Application Priority Data

Apr. 29, 1992 [DE] Germany ............... 42 13 972

[51] Int. Cl.$^6$ .................................... C08K 5/00
[52] U.S. Cl. .................. 524/1; 524/81; 524/115; 524/155
[58] Field of Search ............... 526/193; 521/79; 568/45; 525/396, 391, 342, 395; 524/1, 81, 115, 155

[56] References Cited

U.S. PATENT DOCUMENTS

| | | | |
|---|---|---|---|
| 2,047,398 | 7/1936 | Vess et al. | 524/1 |
| 2,789,099 | 4/1957 | Rife et al. | 524/1 |
| 4,306,048 | 12/1981 | Yoshida et al. | 524/155 |
| 4,396,734 | 8/1983 | Williams et al. | 524/89 |
| 4,743,661 | 5/1988 | Mitutla et al. | 525/396 |
| 5,214,089 | 5/1993 | Login et al. | |

*Primary Examiner*—Cecilia J. Tsang
*Assistant Examiner*—Michael Borin
*Attorney, Agent, or Firm*—Oblon, Spivak, McClelland, Maier & Neustadt, P.C.

[57] ABSTRACT

A process for stabilizing a copolymer of maleic acid or maleic anhydride and vinyl alkyl ethers against a reduction in molecular weight in aqueous solution or in the solution of an organic solvent by adding 0.001 to 10% by weight, based on the copolymer, of a reducing agent, a tert-butyl-containing phenol or a mixture thereof.

2 Claims, No Drawings

STABILIZATION OF COPOLYMERS OF MALEIC ACID OR MALEIC ANHYDRIDE AND VINYL ALKYL ETHERS

This application is a 371 of PCT/EP93/00954, filed Apr. 20, 1993.

The present invention relates to a process for stabilizing copolymers of maleic acid or maleic anhydride and vinyl alkyl ethers against a reduction in molecular weight in aqueous solution or in an organic solvent.

Copolymers of maleic acid and vinyl alkyl ethers or copolymers of maleic anhydride and vinyl alkyl ethers are known substances, cf. U.S. Pat. No. 2,047,398 and Ind. Eng. Chem., Volume 41, page 1509 (1949). Copolymers of maleic anhydride and vinyl alkyl ethers are hydrolyzed on dissolution in water, one anhydride group forming two carboxyl groups. The copolymers are then formally built up from maleic acid and vinyl alkyl ether units. The viscosity of the aqueous solutions of copolymers of maleic acid and vinyl alkyl ethers is a logarithmic function of the molecular weight. According to Technical Bulletin 7543–017 published by GAF Corporation in 1965, the maximum handleable concentrations of copolymers of maleic acid and alkyl vinyl ethers at 25° C. for a polymer having a specific viscosity (1 g per 100 ml of methyl ethyl ketone) of from 2.6 to 3.5 is 20% by weight and for copolymers having a specific viscosity of from 0.1 to 0.5 is 35% by weight. At these relatively low polymer concentrations, in particular the high-viscosity and dilute aqueous solutions or solutions of copolymers of maleic acid and alkyl vinyl ethers are susceptible to a reduction in the molecular weight (cf. B. C. Trivedi and B. M. Culbertson, Maleic Anhydride, Plenum Press, New York, 1982, p. 437.

U.S. Pat. No. 2,789,099 discloses that aqueous solutions of polyacrylic acid can be stabilized against gelling during storage by polymerizing acrylic acid in aqueous solution in the presence of sodium hypophosphite as viscosity regulator and in the presence of copper salts.

DE-A-3,030,344 discloses that pulverulent, high-molecular-weight acrylamide polymers can be prepared by drying aqueous solutions of these polymers in the presence of tert-butyl-containing phenols, thioethers or phosphites. These compounds may also be present as early as during the polymerization. They prevent the polymers becoming insoluble during drying.

It is an object of the present invention to stabilize copolymers of maleic acid or maleic anhydride and alkyl vinyl ethers against a reduction in molecular weight, which occurs in particular in aqueous solution or in an organic solvent.

We have found that this object is achieved by a process for stabilizing a copolymer of maleic acid or maleic anhydride and vinyl alkyl ethers against a reduction in molecular weight, which comprises adding from 0.001 to 10% by weight, based on the copolymer, of a reducing agent, selected from the group consisting of sulfurous acid, phosphinic acid, dithionic acid, ascorbic acid and ammonium or alkali metal salts of said acids, to a solution of the copolymer in water or an organic solvent.

Suitable reducing agents are all compounds which have a reducing action, for example sulfurous acid, dithionic acid, hydrogen sulfide, hypophosphorous acid, phosphinic acid, phosphorous acid, diphosphoric acid, hypophosphoric acid and the water-soluble ammonium, alkali metal and alkaline earth metal salts of said acids. Preferred reducing agents are sulfurous acid, phosphinic acid, dithionic acid and ascorbic acid, either as a free acid or in the form of ammonium or alkali metal salts.

The copolymers are stabilized by adding the suitable stabilizers to solutions of the copolymers in water or an organic solvent. The stabilizers are employed in amounts of from 0.001 to 10% by weight, preferably from 0.01 to 5% by weight, usually in amounts of from 0.05 to 2% by weight. They can be added to the copolymer solutions directly after the polymerization or to polymer solutions if they are to be stabilized against a reduction in molecular weight. The stabilizers are usually added to the solution directly after the polymerization so that a reduction in molecular weight is prevented even during work-up of the copolymers.

The copolymers have an essentially alternating structure and contain maleic anhydride or maleic acid as one essential component and at least one alkyl vinyl ether as the other component. Any alkyl vinyl ether can be used here for the preparation of the copolymers, for example vinyl alkyl ethers having 1 to 30 carbon atoms in the alkyl group. Preference is given to vinyl alkyl ethers which have 1 to 18 carbon atoms. The use of stabilizers is of particular interest in the case of copolymers of high molecular weight. For example, the Fikentscher K values for copolymers of maleic anhydride and alkyl vinyl ethers is from 25 to 110, measured in 1% strength by weight solution in cyclohexanone. Copolymers having K values of greater than 45 are preferably stabilized according to the invention.

Copolymers of maleic acid and alkyl vinyl ethers have K values of from 30 to 180 (determined on the sodium salt by the Fikentscher method at a polymer concentration of 1% by weight and at 25° C. and pH 7) or from 30 to 330 (determined by the Fikentscher method at a polymer concentration of 0.1% by weight and at 25° C. and pH 2). While low-molecular-weight copolymers of maleic anhydride or maleic acid and alkyl vinyl ethers are relatively stable, even in solution, solutions of relatively high-molecular-weight copolymers rapidly undergo undesired degradation if the copolymers are not stabilized. The stabilizers are expediently added to the solutions of the copolymers at from 0 to 60° C., preferably at from 10 to 45° C. Suitable solvents for copolymers of maleic anhydride and alkyl vinyl ethers are all organic solvents which do not react with the anhydride groups of the copolymer, for example ketones, esters and ethers. Examples of individual compounds are acetone, methyl ethyl ketone, ethyl acetate, isopropyl acetate, butyl acetate, isobutyl acetate, tetrahydrofuran, methyl acetate, butyl formate, cyclohexanone, cyclopentenone and propyl formate.

The concentration of the copolymers in the organic solvents is usually from 5 to 70% by weight.

Copolymers of maleic acid and vinyl alkyl ethers are preferably stabilized in the form of aqueous solutions.

The K values indicated in the examples were determined by the method of H. Fikentscher, Cellulosechemie, Volume 13 (1932), pages 58 to 64 and 71 to 74. Copolymers of maleic anhydride and alkyl vinyl ethers were determined in 1% strength solution in cyclohexanone and copolymers of maleic acid and alkyl vinyl ethers were determined in 0.1% strength aqueous solution, in both cases at 25° C. and pH 2.

EXAMPLES

Preparation of the Copolymers

Copolymer 1

155 g of acetone were introduced under nitrogen into a 2 l glass flask fitted with anchor stirrer, reflux condenser and metering devices. A solution of 300 g of maleic anhydride in 400 g of acetone served as feed 1. 264 ml of vinyl methyl ether served as feed 2. A solution of 4.5 g of 2,2'-azobis(2, 4-dimethylvaleronitrile) in 90 g of acetone formed feed 3. 45 ml of feed 1, 15 ml of feed 2 and 15 ml of feed 3 were introduced into the flask, and the mixture was then heated to the boil. After 15 minutes, feed 1 and feed 2 were metered in over the course of 4 hours and feed 3 over the course of 5 hours, with a constant reflux being maintained. When the addition of feed 3 was complete, the mixture was polymerized at the boiling point for a further 2 hours. 150 ml of acetone was then removed by distillation, giving a clear, colorless solution having a solids content of 48.9% by weight and a K value of 59.2 (1% strength in cyclohexanone).

60 g of water were added to this solution at 56° C. over the course of one hour, and the mixture was stirred at this temperature for a further hour. The solvent was then removed by distillation at 800 hPa, with 1,550 g of water being added in portions. In total, about 800 ml of the solvent were distilled off. When the distillation was complete, a slightly yellowish solution having a solids content of 25.3% by weight was obtained. The K value (0.1% strength by weight in water at 25° C. and pH 2) was 162.3 and the specific viscosity $\eta_{sp}$ was 1.2.

Copolymer 2

The procedure was similar to that described for the preparation of copolymer 1, but the polymerization initiator used was 2.2 g of tert-amylperneodecanoate. A clear, colorless solution having a solids content of 50.1% by weight was obtained. The K value of the copolymer of maleic anhydride and vinyl methyl ether was 70.3 (1% strength by weight in cyclohexanone). Hydrolysis gave a virtually colorless, aqueous solution having a solids content of 13.4% by weight. The copolymer of maleic acid and methyl vinyl ether had a K value of 208.4 (0.1% strength in water at 25° C. and pH 2).

Example 1

Samples of the 25.3% strength by weight aqueous solution of copolymer 1 were introduced at 25° C. into colorless glass bottles, the stabilizers indicated in Table 1 were added, and the samples were stored at 25° C. In case (f), the mixing and storage temperature was 45° C. For comparison, an unstabilized sample (g) was stored together with the stabilized samples at 25° C. After the times indicated in Table 1, the K values of the copolymers were determined. They serve as a measure of the effectiveness of the stabilizers tested.

TABLE 1

K values of stabilized samples of copolymer 1 and an unstabilized sample after storage for

| Example 1 | Stabilizer | Start | 3 weeks | 6 weeks | 12 weeks | 24 weeks |
|---|---|---|---|---|---|---|
| a | Ascorbic acid | 162.3 | 153.8 | 145.7 | 140.8 | 135.7 |
| b | Sodium dithionite | 162.3 | 158.6 | 156.1 | 154.4 | 154.3 |
| c | Sodium bisulfite | 162.3 | 159.2 | 160.3 | 157.3 | 154.8 |
| d | Phosphinic acid | 162.3 | 163.4 | 161.8 | 161.4 | 162.0 |
| e | Phosphinic acid | 162.3 | 162.4 | 161.4 | 160.9 | 161.3 |
| f | Phosphinic acid | 162.3 | 162.2 | 160.7 | 161.0 | 160.5 |
| g (comparison) | — | 162.3 | 151.2 | 140.6 | 128.3 | 121.2 |

Example 2

The 13.4% strength by weight aqueous solution of copolymer 2 was divided into a number of portions, and the amounts of stabilizers indicated in Table 2 were added to each portion. With the exception of sample (f), in which 0.05% by weight of phosphinic acid was used as stabilizer, 0.1% by weight of the stabilizers indicated in Table 2 was added in each case. While the temperature of the aqueous solution in Examples a to e was 25° C., it was 45° C. in Example f. The aqueous solutions of copolymer 2 stabilized in this way were stored at 25° C. (Examples a to e) or 45° C. (Example f). After the times indicated in Table 2, samples were taken in each case, and the K values of the polymers were determined. The results are shown in Table 2. For comparison, an unstabilized sample was tested (g).

TABLE 2

K values (measured in 0.1% strength solution in water at 25° C.) of samples a)–f) containing a stabilizer compared with an unstabilized sample of an aqueous solution of copolymer 2

| Example 2 | Stabilizer | Start | 3 weeks | 6 weeks | 12 weeks | 24 weeks |
|---|---|---|---|---|---|---|
| a | Ascorbic acid | 208.4 | 195.6 | 183.4 | 164.3 | 159.1 |
| b | Sodium dithionite | 208.4 | 206.5 | 204.3 | 204.4 | 202.6 |
| c | Sodium bisulfite | 208.4 | 208.3 | 203.8 | 203.0 | 203.2 |
| d | Phosphinic acid | 208.4 | 210.8 | 209.7 | 208.0 | 208.1 |
| e | Phosphinic acid | 208.4 | 207.5 | 206.3 | 206.0 | 205.3 |
| f | Phosphinic acid | 208.4 | 208.0 | 207.3 | 206.1 | 204.6 |
| g (comparison) | — | 208.4 | 190.0 | 178.7 | 149.4 | 138.3 |

We claim:

1. A process for stabilizing a copolymer of maleic acid or maleic anhydride and vinyl alkyl ethers against a reduction in molecular weight, which comprises adding from 0.001 to 10% by weight, based on the copolymer, of a compound selected from the group consisting of phosphinic acid and ammonium or alkali metal salts of said acid, to a solution of the copolymer in water or an organic solvent.

2. The process as claimed in claim 1, wherein one of said compound is added to a solution of the copolymer in water.

* * * * *